United States Patent
Yu et al.

(10) Patent No.: US 8,916,812 B2
(45) Date of Patent: Dec. 23, 2014

(54) OPTICAL MODULE

(75) Inventors: Fei Yu, Santa Clara, CA (US); Tongxin Zeng, Shenzhen (CN); Junying Zhao, Shenzhen (CN); Yuan Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 500 days.

(21) Appl. No.: 13/424,753

(22) Filed: Mar. 20, 2012

(65) Prior Publication Data

US 2012/0175502 A1    Jul. 12, 2012

Related U.S. Application Data

(63) Continuation of application No. PCT/CN2010/076920, filed on Sep. 15, 2010.

(30) Foreign Application Priority Data

Sep. 24, 2009   (CN) .......................... 2009 1 0190744

(51) Int. Cl.
*G02B 6/36* (2006.01)
*G02B 6/42* (2006.01)
*G02B 6/38* (2006.01)

(52) U.S. Cl.
CPC ............ *G02B 6/4292* (2013.01); *G02B 6/4249* (2013.01); *G02B 6/3885* (2013.01); *G02B 6/421* (2013.01); *G02B 6/4246* (2013.01)
USPC ........................................ 250/227.11; 385/78

(58) Field of Classification Search
CPC ................................. G02B 6/3885; G02B 6/36
USPC .................................. 250/227.11; 385/56, 78
See application file for complete search history.

(56) References Cited

U.S. PATENT DOCUMENTS

| | | | |
|---|---|---|---|
| 5,647,042 A | 7/1997 | Ochiai et al. | |
| 8,348,516 B2 * | 1/2013 | Roth | 385/53 |
| 8,414,199 B2 * | 4/2013 | Ishigami | 385/93 |

(Continued)

FOREIGN PATENT DOCUMENTS

| | | | |
|---|---|---|---|
| CN | 1542483 A | 11/2004 | |
| CN | 1688910 A | 10/2005 | |

(Continued)

OTHER PUBLICATIONS

Partial Translation of Office Action dated Jun. 27, 2012 in connection with Chinese Patent Application No. 2009101907443.

(Continued)

*Primary Examiner* — Seung C Sohn (57) ABSTRACT

Embodiments of the present invention provide an optical module, including an MT-Ferrule and a photoelectric conversion unit. The MT-Ferrule is configured to connect multiple channels of optical channels outside the optical module with multiple channels of optical channels of the photoelectric conversion unit, and implement coupling and transmission of multiple channels of single-mode optical signals between the two. The photoelectric conversion unit is configured to convert multiple channels of single-mode optical signals input from the MT-Ferrule into multiple channels of electrical signals and output the multiple channels of electrical signals, and generate, driven by multiple channels of input electrical signals, multiple channels of single-mode optical signals and output the multiple channels of single-mode optical signals to the MT-Ferrule.

20 Claims, 6 Drawing Sheets

(56) References Cited

U.S. PATENT DOCUMENTS

| | | | |
|---|---|---|---|
| 8,465,213 B2 * | 6/2013 | Tamura et al. ................... | 385/92 |
| 2004/0091215 A1 | 5/2004 | Barnoski et al. | |
| 2006/0072879 A1 | 4/2006 | Yang et al. | |
| 2008/0260334 A1 | 10/2008 | Sakaji et al. | |

FOREIGN PATENT DOCUMENTS

| | | |
|---|---|---|
| CN | 101031834 A | 9/2007 |
| CN | 101158737 A | 4/2008 |
| CN | 101473258 A | 7/2009 |
| EP | 1431788 A2 | 6/2004 |
| JP | 2001007403 A | 1/2001 |
| JP | 2001013361 A | 1/2001 |

OTHER PUBLICATIONS

International Search Report dated Dec. 23, 2010 in connection with International Patent Application No. PCT/CN2010/076920.
Partial Translation of Office Action dated Oct. 26, 2011 in connection with Chinese Patent Application No. 2009101907443.
Written Opinion of the International Searching Authority dated Dec. 23, 2010 in connection with International Patent Application No. PCT/CN2010/076920.

\* cited by examiner

OPTICAL MODULE

CROSS-REFERENCE TO RELATED APPLICATIONS

This application is a continuation of International Application No. PCT/CN2010/076920, filed on Sep. 15, 2010, which claims priority to Chinese Patent Application No. 200910190744.3, filed on Sep. 24, 2009, both of which are hereby incorporated by reference in their entireties.

TECHNICAL FIELD

The present invention relates to the field of optical communications technologies, and in particular, to an optical module in an optical transmission system.

BACKGROUND

Currently, existing optical modules, for example, SFP (Small Form-factor Pluggable, small form-factor pluggable) modules each have one channel of optical channel, and for system products with a layout by ultimate capabilities, a single slot has a width of 1.0 inch, a handle bar has a height of 9 U, and 24 optical interfaces may be set at most, that is, 24 optical modules may be set, so that a layout density of optical channels is relatively low.

In the process of implementing the present invention, the inventor finds that due to increasing capacity of an optical network system, a density of the optical interfaces needs to be further improved.

SUMMARY

Embodiments of the present invention provide an optical module, which can implement a high-density layout of multiple optical channels.

To solve the foregoing technical problems, technical solutions according to the embodiments of the present invention are as follows:

An optical module includes an MT-Ferrule and a photoelectric conversion unit.

The MT-Ferrule is configured to connect multiple channels of optical channels outside the optical module with multiple channels of optical channels of the photoelectric conversion unit, and implement coupling and transmission of multiple channels of single-mode optical signals between the two.

The photoelectric conversion unit is configured to convert multiple channels of single-mode optical signals input from the MT-Ferrule into multiple channels of electrical signals and output the multiple channels of electrical signals, and generate, driven by multiple channels of input electrical signals, multiple channels of single-mode optical signals and output the multiple channels of single-mode optical signals to the MT-Ferrule.

In the embodiments of the present invention, the MT-Ferrule and the photoelectric conversion unit are combined together to implement parallel transmission of the multiple channels of single-mode optical signals, thus improving a layout density of the optical channels.

BRIEF DESCRIPTION OF THE DRAWINGS

To illustrate the technical solutions according to the embodiments of the present invention or in the prior art more clearly, accompanying drawings required for describing the embodiments or the prior art are introduced briefly in the following. Apparently, the accompanying drawings in the following description are only some embodiments of the present invention, and persons of ordinary skill in the art may further obtain other drawings from the accompanying drawings without creative efforts.

DETAILED DESCRIPTION

The technical solutions according to the embodiments of the present invention are clearly and fully described in the following with reference to the accompanying drawings in the embodiments of the present invention. Obviously, the embodiments to be described are only part of rather than all of the embodiments of the present invention. All other embodiments obtained by persons of ordinary skill in the art based on the embodiments of the present invention without creative efforts shall fall within the protection scope of the present invention.

Figure 1:
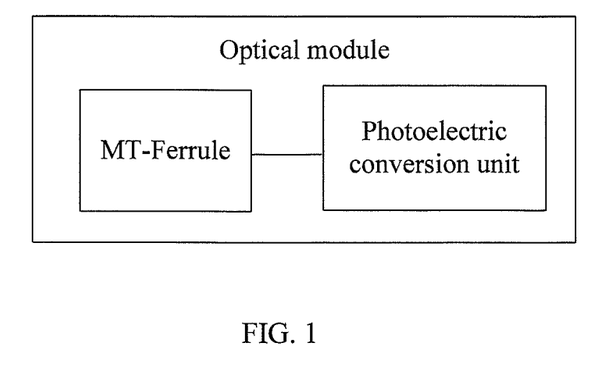
FIG. 1 is a schematic structural diagram of an embodiment of an optical module according to the present invention.

As shown in FIG. 1, an embodiment of the present invention provides an optical module, including: an MT-Ferrule (Mechanically Transferable-Ferrule, mechanically transferable-ferrule) and a photoelectric conversion unit.

The MT-Ferrule is configured to connect multiple channels (greater than or equal to two channels) of optical channels outside the optical module with multiple channels (greater than or equal to two channels) optical channels of the photoelectric conversion unit, so as to implement coupling and transmission of multiple channels of single-mode optical signals between the two.

The photoelectric conversion unit is configured to convert multiple channels of single-mode optical signals input from the MT-Ferrule into multiple channels of electrical signals and output the multiple channels of electrical signals; or generate, driven by multiple channels of input electrical signals, multiple channels of single-mode optical signals and output the multiple channels of single-mode optical signals to the MT-Ferrule; or convert the multiple channels of single-mode optical signals input from the MT-Ferrule into multiple channels of electrical signals and output the multiple channels of electrical signals, and generate, driven by the multiple channels of input electrical signals, multiple channels of single-mode optical signals and output the multiple channels of single-mode optical signals to the MT-Ferrule.

In the embodiment of the present invention, the MT-Ferrule and the photoelectric conversion unit are combined together to implement parallel transmission of the multiple channels of single-mode optical signals, thus improving a layout density of the optical channels and further realizing optical transport in scenarios of long distances (at least 20 Km), and because the multiple channels of single-mode optical signals are transmitted at the same time, compared with a manner of adopting multiple apparatuses that can transmit only one channel of optical signal, an integration degree is improved, the number of apparatuses and the number of times of assembly are reduced, and costs are lowered.

The multiple channels of optical channels may be optical fiber ribbons or multiple optical waveguides. The optical channels in the photoelectric conversion unit may be in a single-fiber unidirectional form or in a single-fiber bidirectional form.

In another embodiment of the present invention, the photoelectric conversion unit is further configured to receive the multiple channels of single-mode optical signals input from the MT-Ferrule and convert the multiple channels of single-mode optical signals through a PD (Photo Detector, photo detector) into electrical signals, amplify the electrical signals through a TiA (Transimpedance amplifier, transimpedance amplifier), and transmit the electrical signals to an electrical processing unit; or generate, driven by multiple channels of electrical signals generated by the electrical processing unit, multiple channels of single-mode optical signals through an LD (Laser Diode, laser diode) and transmit the multiple channels of single-mode optical signals to the MT-Ferrule; or receive the multiple channels of single-mode optical signals input from the MT-Ferrule and convert the multiple channels of single-mode optical signals through a PD (Photo Detector, photo detector) into electrical signals, amplify the electrical signals through a TiA (Transimpedance amplifier, transimpedance amplifier), and transmit the electrical signals to an electrical processing unit, and generate, driven by multiple channels of electrical signals generated by the electrical processing unit, multiple channels of single-mode optical signals through an LD and transmit the multiple channels of single-mode optical signals to the MT-Ferrule.

Figure 2:
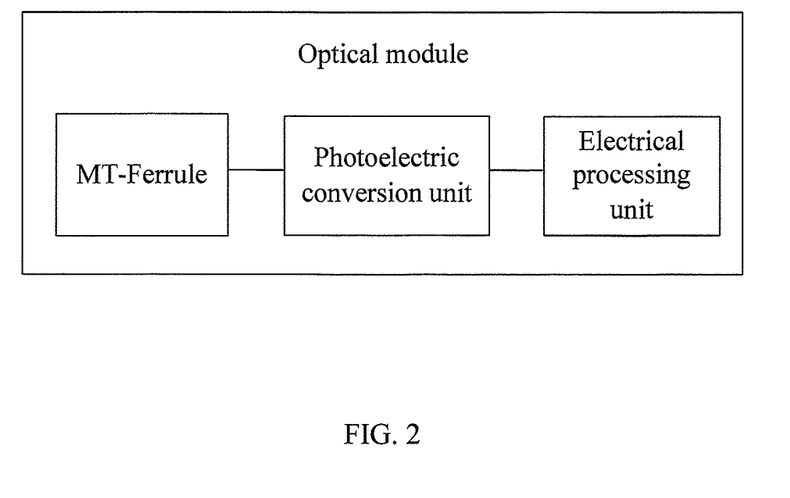
FIG. 2 is a schematic structural diagram of another embodiment of the optical module according to the present invention.

As shown in FIG. 2, in another embodiment, the optical module may further include an electrical processing unit.

The electrical processing unit is configured to convert multiple channels of electrical signals input from outside the optical module into multiple channels of electrical signals that drive the photoelectric conversion unit to generate multiple channels of single-mode optical signals; or amplify the multiple channels of electrical signals output by the photoelectric conversion unit, and transmit the multiple channels of electrical signals to a circuit outside the optical module; or convert multiple channels of electrical signals input from outside the optical module into multiple channels of electrical signals that drive the photoelectric conversion unit to generate multiple channels of single-mode optical signals, and amplify the multiple channels of electrical signals output by the photoelectric conversion unit and transmit the multiple channels of electrical signals to a circuit outside the optical module.

In another embodiment, the electrical processing unit is further configured to perform time sequence and logic management on the converted and amplified multiple channels of electrical signals.

In another embodiment of the present invention, the electrical processing unit may be specifically configured to convert multiple channels of electrical signals input from outside the optical module into multiple channels of electrical signals that drive an LD (Laser Diode, laser diode) of the photoelectric conversion unit to generate multiple channels of single-mode optical signals; or amplify the multiple channels of electrical signals converted and amplified by a PD (Photo Detector, photo detector) of the photoelectric conversion unit and transmit the multiple channels of electrical signals to a circuit outside the optical module; or implement both of the foregoing two processes. The electrical processing unit is further configured to perform time sequence and logic management on the converted and amplified multiple channels of electrical signals.

Figure 3:
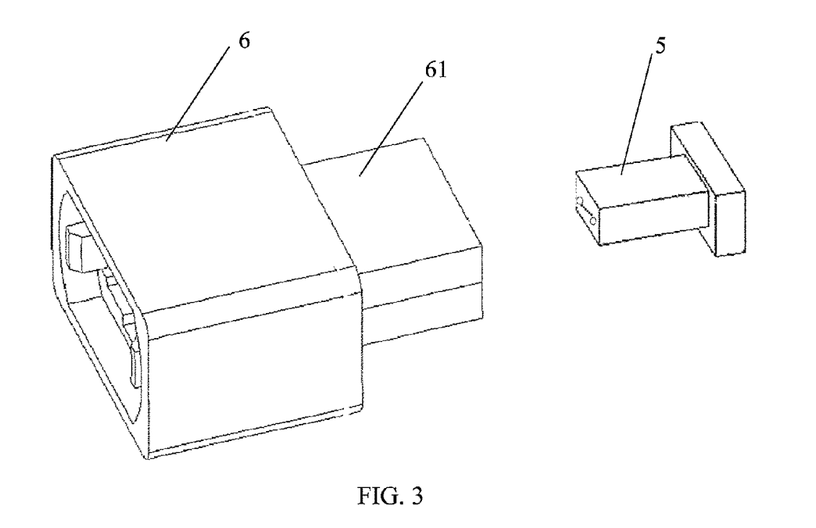
FIG. 3 is a schematic structural diagram of a receptacle and an MT-Ferrule in the embodiment of the optical module according to the present invention.

As shown in FIG. 3, in another embodiment, the optical module further includes a receptacle 6, the receptacle has a recessed accommodation portion 61, an inner wall of the accommodation portion 61 adapts to the outline of the MT-Ferrule 5, the MT-Ferrule 5 is accommodated in the accommodation portion 61, and the accommodation portion 61 is configured to fix the MT-Ferrule 5, so that a multi-channel optical connector matching with the receptacle (for example, an MPO (Multi-fiber Push-On, multi-fiber push-on multi-channel optical connector) or an MTP (Multi-fiber Termination Push-on, multi-fiber termination push-on multi-channel optical connector) optical connector) can be connected to the MT-Ferrule to transmit signals.

Figure 4:
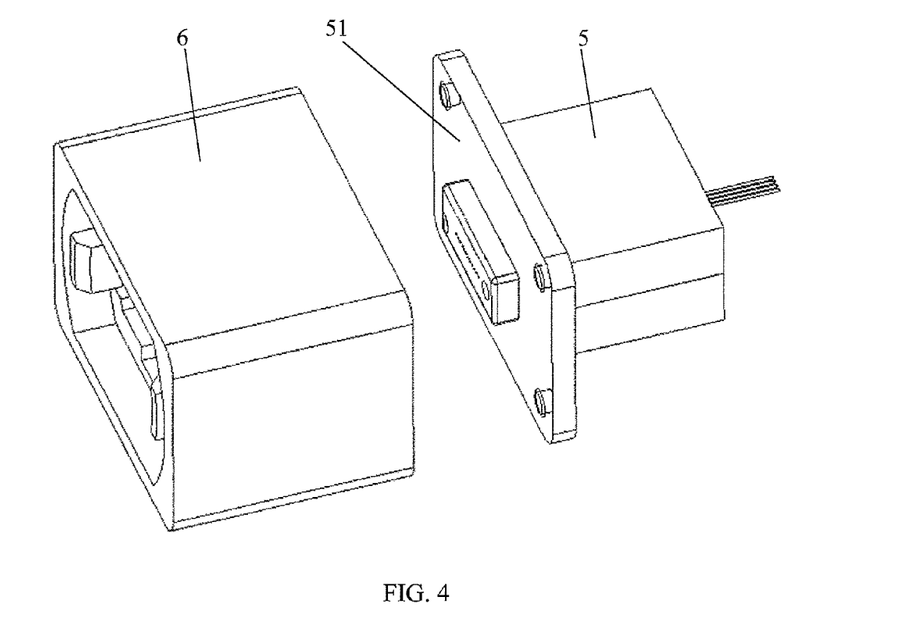
FIG. 4 is a schematic structural diagram of the receptacle and the MT-Ferrule in the embodiment of the optical module according to the present invention.

Alternatively, as shown in FIG. 4, in another design form, the MT-Ferrule is disposed with a connection portion 51, the connection portion 51 of the MT-Ferrule 5 is retained on the receptacle 6 or fixed on the receptacle 6 through a medium (for example, a screw or an adhesive), and the receptacle 6 fixes the MT-Ferrule 5 through the connection portion 51, so that a multi-channel optical connector matching with the receptacle 6 (for example, an MPO or an MTP optical connector) can be connected to the MT-Ferrule 5 to transmit signals.

Figure 5:
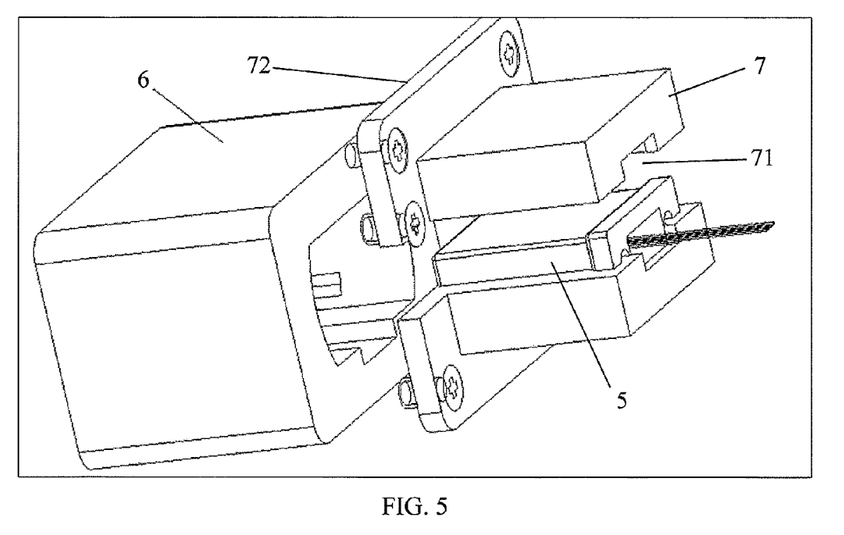
FIG. 5 is a schematic structural diagram of the receptacle, the MT-Ferrule and a fixing member in the embodiment of the optical module according to the present invention.

Alternatively, as shown in FIG. 5, in another design form, the optical module further includes a receptacle 6 and a fixing member 7, the fixing member 7 has a recessed containing portion 71, the MT-Ferrule 5 is accommodated in the containing portion 71, and the outline of the MT-Ferrule 5 adapts to the shape of an inner wall of the containing portion 71, so that the MT-Ferrule can be exactly retained in the containing portion or fixed in the containing portion through a medium (for example, a screw or an adhesive). The fixing member 7 is further disposed with a joint portion 72, and the joint portion 72 is connected and fixed to the receptacle 6, so that a multi-channel optical connector matching with the receptacle (for example, an MPO or an MTP optical connector) can be connected to the MT-Ferrule 5 to transmit signals.

As shown in FIG. 5, the fixing member 7 may be disposed with two upper and lower separated portions, a cavity is disposed inside at least one of the separated portions, and the two separated portions are combined together so that the cavity forms the containing portion 71. After the MT-Ferrule 5 is accommodated in the containing portion 71, the MT-Ferrule may be clamped and fixed through the two upper and lower separated portions.

Figure 6:
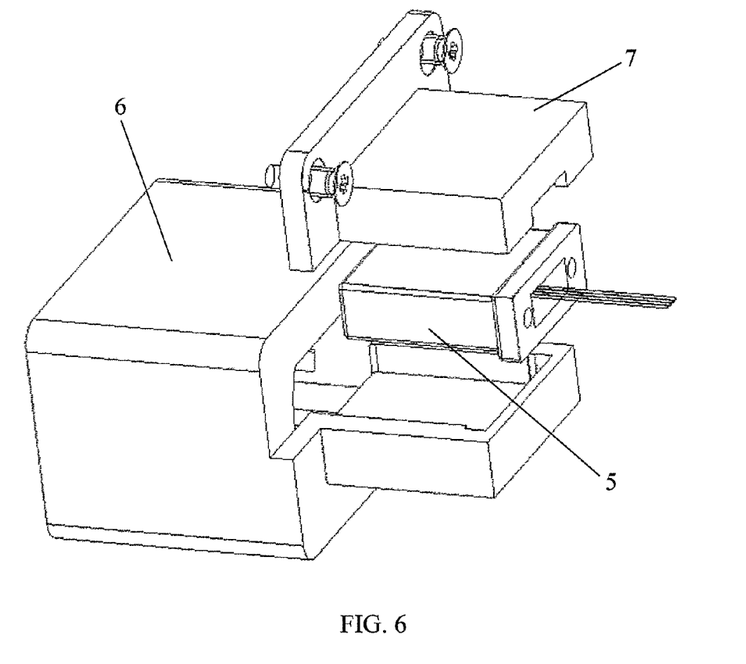
FIG. 6 is a schematic structural diagram of the receptacle, the MT-Ferrule and the fixing member in the embodiment of the optical module according to the present invention.

Further, as shown in FIG. 6, the fixing member 7 is disposed with two upper and lower separated port ions, and one of the two separated portions is integrally formed with the receptacle 6. It can be easily understood that, the fixing member 7 may also be integrally formed with the MT-Ferrule 5.

In the embodiment of the present invention, the MT-Ferrule is connected to the photoelectric conversion unit in the following manners.

Figure 7:
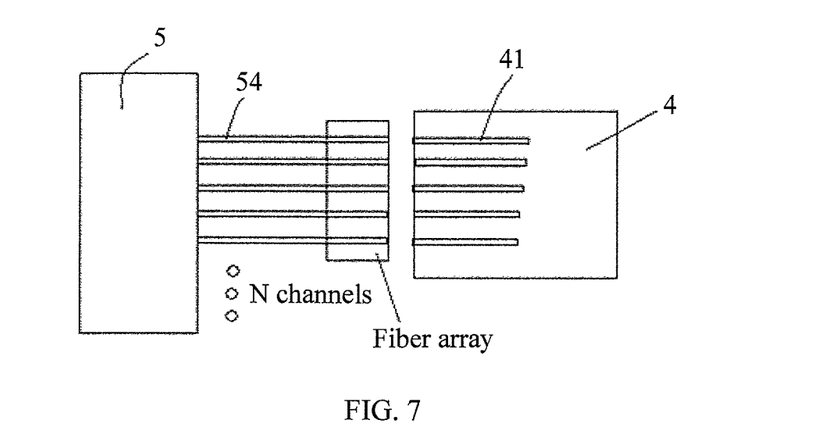
FIG. 7 is a schematic diagram of connection between the MT-Ferrule and a photoelectric conversion unit in the embodiment of the optical module according to the present invention.

As shown in FIG. 7, each channel of the multiple channels of optical channels 54 of the MT-Ferrule 5 is coupled to each channel of the multiple channels of optical channels 41 (which may be multiple optical waveguides or optical fiber ribbons) of the photoelectric conversion unit 4 respectively. Tail ends of the multiple channels of optical channels 54 of the MT-Ferrule 5 may be in the form of a FiberArray (fiber array), and the FiberArray is coupled to the multiple channels of optical channels 41 of the photoelectric conversion unit 4.

Figure 8:
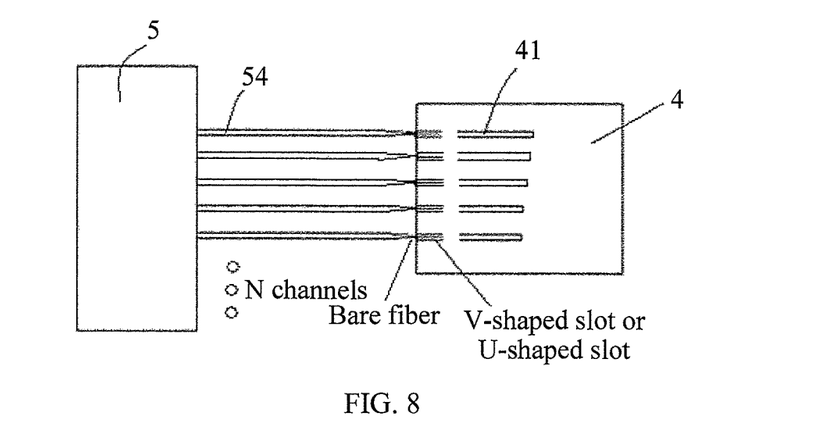
FIG. 8 is a schematic diagram of another form of connection between the MT-Ferrule and the photoelectric conversion unit in the embodiment of the optical module according to the present invention.

Alternatively, as shown in FIG. 8, tail ends of the multiple channels of optical channels 54 of the MT-Ferrule 5 may be multiple bare fibers, and the multiple bare fibers are located in a limiting slot of the photoelectric conversion unit 4 (for example, a V-shaped slot or U-shaped slot) and coupled to the optical channel 41 of the photoelectric conversion unit 4.

In the embodiment of the present invention, interconnection modes among the MT-Ferrule, the photoelectric conversion unit, and the electrical processing unit and between the foregoing three parts and an external system board are described in the following.

Figure 9:
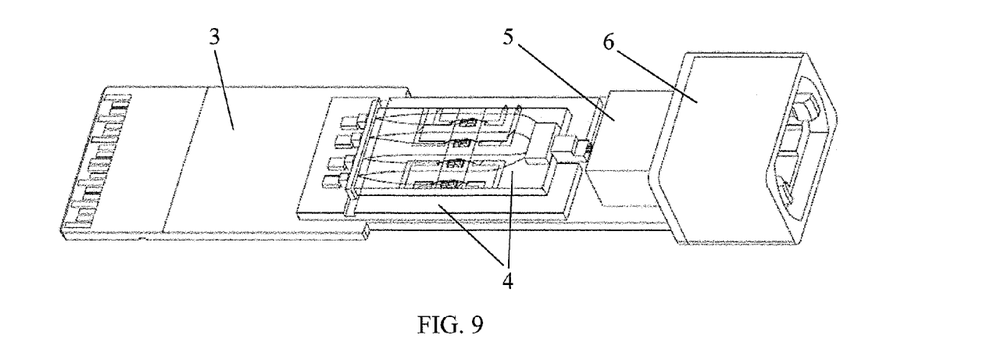
FIG. 9 is a schematic diagram of an interconnection mode among the MT-Ferrule, the photoelectric conversion unit, and an electrical processing unit and between the foregoing three parts and an external system board in the embodiment of the optical module according to the present invention.

FIG. 9 is a schematic structural diagram of a first interconnection mode.

The optical module includes the MT-Ferrule 5, the photoelectric conversion unit 4, and the electrical processing unit 3, the electrical processing unit 3 and the external system board are separately disposed, the MT-Ferrule 5 is optically connected to the photoelectric conversion unit 4, and the photoelectric conversion unit 4 is electrically connected to the electrical processing unit 3. The optical module is electrically connected to the external system board through a golden finger or a connector.

Figure 10:
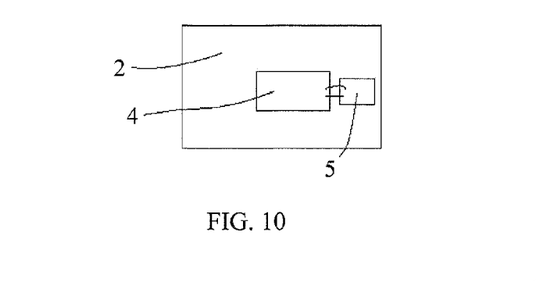
FIG. 10 is a schematic diagram of another interconnection mode among the MT-Ferrule, the photoelectric conversion unit, and the electrical processing unit and between the foregoing three parts and the external system board in the embodiment of the optical module according to the present invention.

FIG. 10 is a schematic structural diagram of a second interconnection mode.

The optical module includes the MT-Ferrule 5 and the photoelectric conversion unit 4, the electrical processing unit is integrated on an external system board 2, the MT-Ferrule 5 is optically connected to the photoelectric conversion unit 4, and the photoelectric conversion unit 4 is electrically connected to the external system board 2 through a golden finger or a connector.

Figure 11:
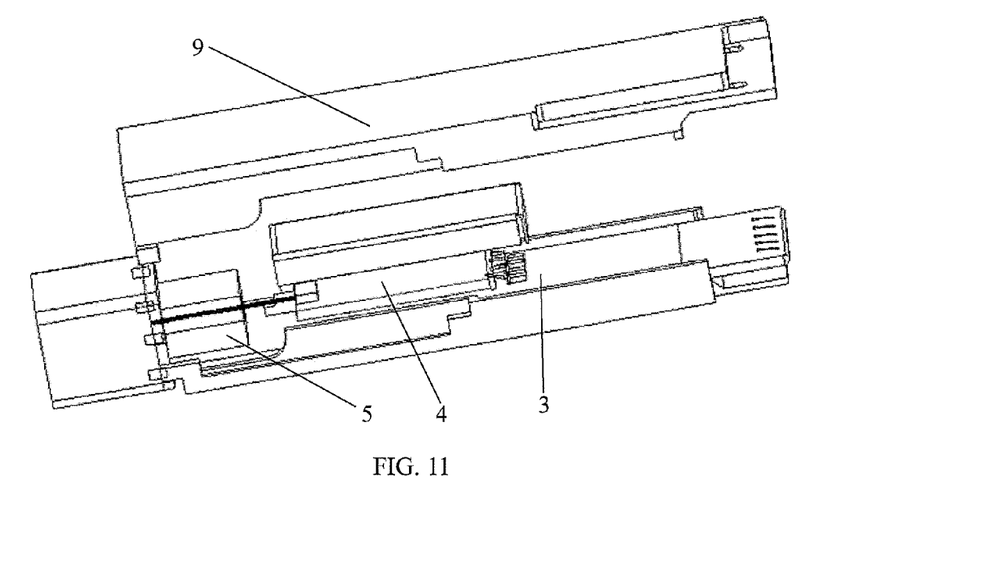
FIG. 11 is a schematic diagram of a case in the embodiment of the optical module according to the present invention.

As shown in FIG. 11, in the embodiment of the present invention, in addition to the MT-Ferrule and the photoelectric conversion unit, the optical module further includes a case 9, the case 9 is covered on the MT-Ferrule 5 and the photoelectric conversion unit 4, or the case is covered on the MT-Ferrules, the photoelectric conversion unit 4, and the electrical processing unit 3, for heat dissipation, physical protection, and electromagnetic shielding.

Figure 12:
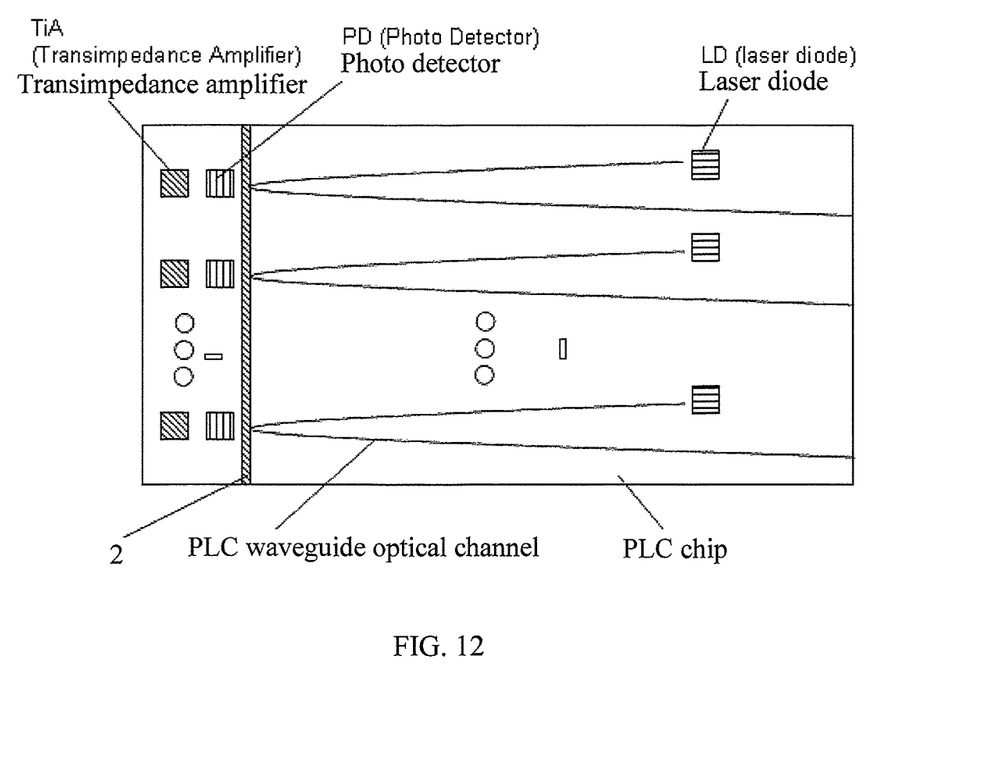
FIG. 12 is a schematic diagram of optical processing channels of the photoelectric conversion unit in the embodiment of the optical module according to the present invention.

In the embodiment of the present invention, the photoelectric conversion unit integrates multiple optical processing channels, and the multiple optical processing channels are arranged in parallel (referring to FIG. 12).

As shown in FIG. 12, in a single optical processing channel, optical channels that input optical signals pass through (which are marked as "PLC waveguide optical channels" in the figure) and optical channels through which a filter 2 is connected with the laser diode are basically located in the same plane. The input optical signals enter through the optical channels (which are marked as "PLC waveguide optical channels" in the figure), pass through the filter 2 (integrated in the PLC or disposed independently in the PLC), and are received by the PD; optical signals transmitted from the LD enter the optical channels (which are marked as "PLC waveguide optical channels" in the figure), pass through the filter 2 (integrated in the PLC or disposed independently in the PLC), and are reflected into the same optical channels through which the input optical signals enter, so that the output of the optical signals is completed.

LD chips of the multiple optical processing channels included in the photoelectric conversion unit form multiple LD chips, which may be implemented in the form of multiple discrete LD chips, an LD chip array, a PIC (Photonic Integrated Circuit, photonic integrated circuit), or an OEIC (Optic Electric Integrated Circuit, optic electric integrated circuit).

PD chips of the multiple optical processing channels included in the photoelectric conversion unit form multiple PD chips, which may be implemented in the form of multiple discrete PD chips, a PD chip array, a PIC (Photonic Integrated Circuit, photonic integrated circuit), or an OEIC (Optic Electric Integrated Circuit, optic electric integrated circuit).

The optical channels of the multiple optical processing channels included in the photoelectric conversion unit may be implemented in the form of free space or a PLC (Plannar Lightwave Circuit, planar lightwave circuit).

It can be easily understood that, the photoelectric conversion unit may be a single-mode parallel optical transmitter component, or a single-mode parallel optical receiver component, or a single-mode single-fiber bidirectional parallel optical transceiver component.

The single-mode parallel optical transmitter component may include multiple LD chips, or an LD chip array, or a PIC, or an OEIC, and an optical component for outputting multiple channels of parallel optical signals through manners such as free space or a PLC, for example, a multi-channel optical component based on a PLC, or a multi-channel optical component based on a PIC or an OEIC.

The single-mode parallel optical receiver component may include multiple PD chips, or a PD chip array, or a PIC, or an OEIC, and an optical component for receiving multiple channels of parallel optical signals through manners such as free space or a PLC waveguide, for example, a multi-channel optical component based on a PLC, or a multi-channel optical component based on a PIC or an OEIC.

The single-mode single-fiber bidirectional parallel optical transceiver component may include multiple LD chips or an LD chip array or a PIC or an OEIC, and multiple PD chips or a PD chip array or a PIC or an OEIC, and an optical component for transmitting and receiving multiple channels of parallel optical signals through manners such as free space or a PLC waveguide, for example, a multi-channel optical component based on a PLC, or a multi-channel optical component based on a PIC or an OEIC.

The present invention further provides an embodiment of a communication device, which includes the optical module in the foregoing embodiment, and the communication device may be a P2P (POINT TO POINT, point to point) or PON (PASSIVE OPTICAL NETWORK, passive optical network) optical access device, or a wavelength division photoelectric conversion device, or a router.

The foregoing description is merely several embodiments of the present invention, and persons skilled in the art may make various modifications or variations to the present invention according to the application without departing from the spirit and scope of the present invention.

What is claimed is:

1. An optical module, comprising: an MT-Ferrule and a photoelectric conversion unit, wherein
    the MT-Ferrule is configured to connect multiple channels of optical channels outside the optical module with multiple channels of optical channels of the photoelectric conversion unit; and
    the photoelectric conversion unit is configured to convert multiple channels of single-mode optical signals input from the MT-Ferrule into multiple channels of electrical signals and output the multiple channels of electrical signals; or generate, driven by multiple channels of input electrical signals, multiple channels of single-mode optical signals and output the multiple channels of single-mode optical signals to the MT-Ferrule; or convert the multiple channels of single-mode optical signals input from the MT-Ferrule into multiple channels of electrical signals and output the multiple channels of electrical signals, and generate, driven by multiple channels of input electrical signals, multiple channels of single-mode optical signals and output the multiple channels of single-mode optical signals to the MT-Ferrule.

2. The optical module according to claim 1, further comprising: a receptacle, wherein the receptacle has a recessed accommodation portion, an inner wall of the accommodation portion adapts to the shape of the MT-Ferrule, the MT-Ferrule is accommodated in the accommodation portion, and the accommodation portion is configured to fix the MT-Ferrule, so that a multi-channel optical connector matching with the receptacle can be connected to the MT-Ferrule.

3. The optical module according to claim 1, further comprising: a receptacle, wherein the MT-Ferrule is disposed with a connection portion, the connection portion of the MT-Ferrule is retained on the receptacle or fixed on the receptacle through a medium, and the receptacle fixes the MT-Ferrule through the connection portion, so that a multi-channel optical connector matching with the receptacle can be connected to the MT-Ferrule.

4. The optical module according to claim 1, further comprising: a receptacle and a fixing member, wherein the fixing member has a recessed containing portion, the MT-Ferrule is accommodated in the containing portion, the outline of the MT-Ferrule adapts to the shape of an inner wall of the containing portion, so that the MT-Ferrule can be retained in the containing portion or fixed in the containing portion through a medium, the fixing member is further disposed with a joint portion, and the joint portion is connected to the receptacle and fixed, so that a multi-channel optical connector matching with the receptacle can be connected to the MT-Ferrule.

5. The optical module according to claim 4, wherein the fixing member may be disposed with two upper and lower separated portions, a cavity is disposed inside at least one of the separated portions, the two separated portions are combined together so that the cavity forms the containing portion, the MT-Ferrule is accommodated in the containing portion, and the MT-Ferrule is clamped and fixed through the two upper and lower separated portions.

6. The optical module according to claim 5, wherein the fixing member is disposed with two upper and lower separated portions, and one of the two separated portions is integrally formed with the receptacle.

7. The optical module according to claim 1, wherein tail ends of the multiple channels of optical channels of the MT-Ferrule are in the form of a fiber array, and the fiber array is coupled to the multiple channels of optical channels of the photoelectric conversion unit.

8. The optical module according to claim 1, wherein tail ends of the multiple channels of optical channels of the MT-Ferrule are multiple bare fibers, and the multiple bare fibers are located in a limiting slot of the photoelectric conversion unit and coupled to the optical channels of the photoelectric conversion unit.

9. The optical module according to claim 1, further comprising: an electrical processing unit, wherein
    the electrical processing unit is configured to convert multiple channels of electrical signals input from outside the optical module into multiple channels of electrical signals that drive the photoelectric conversion unit to generate multiple channels of single-mode optical signals; or amplify the multiple channels of electrical signals output by the photoelectric conversion unit and transmit the multiple channels of electrical signals to a circuit outside the optical module; or convert multiple channels of electrical signals input from outside the optical module into multiple channels of electrical signals that drive the photoelectric conversion unit to generate multiple channels of single-mode optical signals, and amplify the multiple channels of electrical signals output by the photoelectric conversion unit and transmit the multiple channels of electrical signals to a circuit outside the optical module.

10. The optical module according to claim 9, wherein the electrical processing unit and an external system board are separately disposed, or the electrical processing unit is integrated on an external system board.

11. The optical module according to claim 1, wherein the photoelectric conversion unit integrates the multiple optical processing channels, and the multiple optical processing channels are arranged in parallel.

12. A communication device, comprising an optical module,
    the optical module comprises an MT-Ferrule and a photoelectric conversion unit, wherein
    the MT-Ferrule is configured to connect multiple channels of optical channels outside the optical module with multiple channels of optical channels of the photoelectric conversion unit; and
    the photoelectric conversion unit is configured to convert multiple channels of single-mode optical signals input from the MT-Ferrule into multiple channels of electrical signals and output the multiple channels of electrical signals; or generate, driven by multiple channels of input electrical signals, multiple channels of single-mode optical signals and output the multiple channels of single-mode optical signals to the MT-Ferrule; or convert the multiple channels of single-mode optical signals input from the MT-Ferrule into multiple channels of electrical signals and output the multiple channels of electrical signals, and generate, driven by multiple channels of input electrical signals, multiple channels of single-mode optical signals and output the multiple channels of single-mode optical signals to the MT-Ferrule.

13. The communication device according to claim 12, the optical module further comprising: a receptacle, wherein the receptacle has a recessed accommodation portion, an inner wall of the accommodation portion adapts to the shape of the MT-Ferrule, the MT-Ferrule is accommodated in the accommodation portion, and the accommodation portion is configured to fix the MT-Ferrule, so that a multi-channel optical connector matching with the receptacle can be connected to the MT-Ferrule.

14. The communication device according to claim 12, the optical module further comprising: a receptacle, wherein the MT-Ferrule is disposed with a connection portion, the connection portion of the MT-Ferrule is retained on the receptacle or fixed on the receptacle through a medium, and the receptacle fixes the MT-Ferrule through the connection portion, so that a multi-channel optical connector matching with the receptacle can be connected to the MT-Ferrule.

15. The communication device according to claim 12, the optical module further comprising: a receptacle and a fixing member, wherein the fixing member has a recessed containing portion, the MT-Ferrule is accommodated in the containing portion, the outline of the MT-Ferrule adapts to the shape of an inner wall of the containing portion, so that the MT-Ferrule can be retained in the containing portion or fixed in the containing portion through a medium, the fixing member is further disposed with a joint portion, and the joint portion is connected to the receptacle and fixed, so that a multi-channel optical connector matching with the receptacle can be connected to the MT-Ferrule.

16. The communication device according to claim 15, wherein the fixing member may be disposed with two upper and lower separated portions, a cavity is disposed inside at least one of the separated portions, the two separated portions are combined together so that the cavity forms the containing portion, the MT-Ferrule is accommodated in the containing portion, and the MT-Ferrule is clamped and fixed through the two upper and lower separated portions.

17. The communication device according to claim 12, wherein tail ends of the multiple channels of optical channels of the MT-Ferrule are in the form of a fiber array, and the fiber array is coupled to the multiple channels of optical channels of the photoelectric conversion unit.

18. The communication device according to claim 12, wherein tail ends of the multiple channels of optical channels of the MT-Ferrule are multiple bare fibers, and the multiple bare fibers are located in a limiting slot of the photoelectric conversion unit and coupled to the optical channels of the photoelectric conversion unit.

19. The communication device according to claim 12, the optical module further comprising: an electrical processing unit, wherein
the electrical processing unit is configured to convert multiple channels of electrical signals input from outside the optical module into multiple channels of electrical signals that drive the photoelectric conversion unit to generate multiple channels of single-mode optical signals; or amplify the multiple channels of electrical signals output by the photoelectric conversion unit and transmit the multiple channels of electrical signals to a circuit outside the optical module; or convert multiple channels of electrical signals input from outside the optical module into multiple channels of electrical signals that drive the photoelectric conversion unit to generate multiple channels of single-mode optical signals, and amplify the multiple channels of electrical signals output by the photoelectric conversion unit and transmit the multiple channels of electrical signals to a circuit outside the optical module.

20. The communication device according to claim 12, wherein the communication device is a P2P or PON optical access device, or a wavelength division photoelectric conversion device, or a router.

* * * * *